(12) United States Patent
Bi et al.

(10) Patent No.: US 12,211,225 B2
(45) Date of Patent: Jan. 28, 2025

(54) SCENE RECONSTRUCTION USING GEOMETRY AND REFLECTANCE VOLUME REPRESENTATION OF SCENE

(71) Applicant: ADOBE INC., San Jose, CA (US)

(72) Inventors: Sai Bi, La Jolla, CA (US); Zexiang Xu, San Jose, CA (US); Kalyan Krishna Sunkavalli, San Jose, CA (US); Miloš Hašan, Oakland, CA (US); Yannick Hold-Geoffroy, San Jose, CA (US); David Jay Kriegman, San Diego, CA (US); Ravi Ramamoorthi, Carlsbad, CA (US)

(73) Assignee: ADOBE INC., San Jose, CA (US)

(*) Notice: Subject to any disclaimer, the term of this patent is extended or adjusted under 35 U.S.C. 154(b) by 459 days.

Patent file contains an affidavit/declaration under 37 CFR 1.130(b).

(21) Appl. No.: 17/231,833

(22) Filed: Apr. 15, 2021

(65) Prior Publication Data

US 2022/0335636 A1    Oct. 20, 2022

(51) Int. Cl.
*G06T 7/586* (2017.01)
*G06T 9/00* (2006.01)
(Continued)

(52) U.S. Cl.
CPC .............. *G06T 7/586* (2017.01); *G06T 9/002* (2013.01); *G06T 15/06* (2013.01); *G06T 15/506* (2013.01);
(Continued)

(58) Field of Classification Search
CPC ......... G06T 7/586; G06T 9/002; G06T 15/06; G06T 15/506; G06T 2207/20081; G06T 2207/20084; G06T 15/20; G06T 7/06
See application file for complete search history.

(56) References Cited

U.S. PATENT DOCUMENTS

| 2017/0278297 A1* | 9/2017 | Ozdas | G06T 15/60 |
| 2019/0179288 A1* | 6/2019 | Wike | B29C 64/386 |

(Continued)

OTHER PUBLICATIONS

Tewari, A., Fried, O., Thies, J., Sitzmann, V., Lombardi, S., Sunkavalli, K., . . . & Zollhöfer, M. (May 2020). State of the art on neural rendering. In Computer Graphics Forum (vol. 39, No. 2, pp. 701-727 (Year: 2020).*

(Continued)

*Primary Examiner* — Ping Y Hsieh
*Assistant Examiner* — Vaisali Rao Koppolu
(74) *Attorney, Agent, or Firm* — Shook, Hardy & Bacon L.L.P.

(57) ABSTRACT

A scene reconstruction system renders images of a scene with high-quality geometry and appearance and supports view synthesis, relighting, and scene editing. Given a set of input images of a scene, the scene reconstruction system trains a network to learn a volume representation of the scene that includes separate geometry and reflectance parameters. Using the volume representation, the scene reconstruction system can render images of the scene under arbitrary viewing (view synthesis) and lighting (relighting) locations. Additionally, the scene reconstruction system can render images that change the reflectance of objects in the scene (scene editing).

20 Claims, 9 Drawing Sheets
(4 of 9 Drawing Sheet(s) Filed in Color)

(51) Int. Cl.
    *G06T 15/06*    (2011.01)
    *G06T 15/50*    (2011.01)
(52) U.S. Cl.
    CPC .............. *G06T 2207/20081* (2013.01); *G06T 2207/20084* (2013.01)

(56) References Cited

U.S. PATENT DOCUMENTS

| | | | |
|---|---|---|---|
| 2020/0327718 A1* | 10/2020 | Saragih | G06T 9/002 |
| 2021/0082185 A1* | 3/2021 | Ziegler | G06T 15/50 |
| 2022/0036602 A1* | 2/2022 | Duckworth | G06T 19/20 |
| 2022/0051471 A1* | 2/2022 | Logothetis | G06V 10/766 |
| 2022/0051481 A1* | 2/2022 | Laine | G06T 7/97 |
| 2023/0056459 A1* | 2/2023 | Shimakawa | G06T 17/20 |
| 2023/0145496 A1* | 5/2023 | Garcés | G06T 3/4046 345/428 |
| 2023/0419600 A1* | 12/2023 | Fanello | G06T 15/20 |

OTHER PUBLICATIONS

Boss, Mark, et al. "NeRD: Neural Reflectance Decomposition from Image Collections." arXiv preprint arXiv:2012.03918 (2020) (Year: 2020).*

* cited by examiner

SCENE RECONSTRUCTION USING GEOMETRY AND REFLECTANCE VOLUME REPRESENTATION OF SCENE

BACKGROUND

Capturing images of a real scene and re-rendering the scene under novel lighting conditions and viewpoints is one of the core challenges in computer vision and graphics. This is classically done by reconstructing the 3D scene geometry, typically in the form of a mesh, and computing per-vertex colors or reflectance parameters, to support arbitrary re-rendering. However, 3D reconstruction methods like multi-view stereo (MVS) are prone to errors in textureless and non-Lambertian regions, and accurate reflectance acquisition usually requires dense, calibrated capture using sophisticated devices.

Recent works have proposed learning-based approaches to capture scene appearance. One class of methods use surface-based representations but are restricted to specific scene categories and cannot synthesize photo-realistic images. Other methods bypass explicit reconstruction, instead focusing on relighting or view synthesis sub-problems.

SUMMARY

Embodiments of the present invention relate to, among other things, a scene reconstruction system that renders images of a scene with high-quality geometry and appearance and supports view synthesis, relighting, and scene editing. Given a set of input images of a scene, the scene reconstruction system trains a network to learn a volume representation of the scene that includes separate geometry and reflectance parameters. Using the volume representation, the scene reconstruction system can render images of the scene under arbitrary viewing (view synthesis) and lighting (relighting) locations. Additionally, the scene reconstruction system can render images that change the reflectance of objects in the scene (scene editing).

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described in detail below with reference to the attached drawing figures, wherein.

DETAILED DESCRIPTION

Overview

Building 3D representations of a scene from images of the scene is an important aspect of 3D design and has a wide range of applications. However, building high-quality 3D representations with both accurate geometry and appearance of objects in the scene is difficult. In particular, previous approaches for scene reconstruction have faced challenges in providing accurate geometry reconstruction, reflectance acquisition, and relighting/view synthesis.

Geometry reconstruction. There is a long history in reconstructing 3D geometry from images using traditional structure from motion and multi-view stereo (MVS) pipelines. Recently, deep learning techniques have also been applied to 3D reconstruction with various representations, including volumes, point clouds, depth maps and implicit functions. The goal is to model scene geometry for realistic image synthesis, for which mesh-based reconstruction is the most common way in many applications. However, it remains challenging to reconstruct accurate meshes for challenging scenes where there are textureless regions and thin structures. It is also difficult to incorporate a mesh into a deep learning framework; the few mesh-based deep learning works are limited to category-specific reconstruction and cannot produce photo-realistic results.

Reflectance acquisition. Reflectance of real materials is classically measured using sophisticated devices to densely acquire light-view samples, which is impractical for common users. Recent works have improved the practicality with fewer samples and more practical devices (mobile phones); however, most of them focus on flat planar objects. A few single-view techniques based on photometric stereo or deep learning are able to handle arbitrary shape, but they merely recover limited single-view scene content. To recover complete shape with spatially varying BRDF (bidirectional reflectance distribution function) from multi-view inputs, previous works usually rely on a pre-reconstructed initial mesh and images captured under complex controlled setups to reconstruct per-vertex BRDFs. While one work uses a mobile phone for practical acquisition, it still requires MVS-based mesh reconstruction, which is ineffective for challenging scenes with textureless, specular and thin-structure regions.

Relighting and view synthesis. Image-based techniques have been extensively explored in graphics and vision to synthesize images under novel lighting and viewpoint without explicit complete reconstruction. Recently, deep learning has been applied to view synthesis and most methods leverage either view-dependent volumes or canonical world-space volumes for geometric-aware appearance inference. On the other hand, learning-based relighting techniques have also been developed. Purely image-based methods are able to relight scenes with realistic specularities and soft shadows from sparse inputs, but unable to reproduce accurate hard shadows; some other methods propose geometry-aware networks and make use of pre-acquired meshes for relighting and view synthesis, and their performance is limited by the mesh reconstruction quality. A further approach models scene geometry and appearance by reconstructing a continuous radiance field for pure view synthesis only (i.e., no ability for relighting).

Embodiments of the present invention address the shortcomings of prior scene reconstruction approaches by providing a scene reconstruction system that enables high-quality scene acquisition and rendering given a set of input images around a scene. The system can use unstructured images captured around a scene, for instance, using a single mobile phone camera. The scene reconstruction system trains a network to learn a volume representation of the scene given the input images. The volume representation represents the geometry and reflectance of the scene. For instance, the volume representation may comprise, opacity, surface normal, and reflectance voxel grids.

In some configurations, the system trains a deep neural network to simultaneously learn the geometry and reflectance of a scene as volumes. A decoder-like network architecture may be employed where an encoding vector together with the corresponding network parameters are learned during a per-scene optimization (training) process. The network decodes the encoding vector to the volume representation that includes geometry (e.g., opacity and normal) and reflectance (e.g., diffuse color and roughness) volumes, which model the global geometry, local surface orientations and spatially-varying reflectance parameters of the scene.

During training, a rendering module may use the volume representation of the scene to render images of the scene under similar viewing and viewing conditions as the input images. A loss function is evaluated at each iteration to compare input images and rendered images, and parameters of the network are updated (e.g., via backpropagation) based on the evaluation.

After training the network, the rendering module uses the learned volume representation of the scene to render images under arbitrary viewpoint and lighting. For instance, a user interface can be provided that enables input to specify an arbitrary viewing location and lighting location, and the rendering module renders an image of the scene based on the viewing and lighting locations.

In some configurations, the rendering module uses volume ray marching approaches with opacity (alpha) accumulation and compositing. Point-wise shading may be computed using local normal and reflectance properties, and the shaded colors with opacities accumulated along each marching ray of sight.

The technology described herein provides advantages over other scene reconstruction approaches. Unlike the opacity used in previous view synthesis work that is only accumulated along view directions, the scene reconstruction system in some aspects of the technology described herein learns global scene opacity that can be accumulated from both view and light directions. The approach described herein enables scene opacity to be effectively learned and used to compute accurate hard shadows under novel lighting, even when the training process never observed images with shadows taken under non-collocated view-light setups. Moreover, different from previous volume-based works that learn a single color at each voxel, the technology described herein may reconstruct per-voxel reflectance and handle complex materials with high glossiness. The neural rendering framework thus enables rendering with complex view-dependent and light-dependent shading effects including specularities, occlusions, and shadows. Comparison against state-of-the-art mesh-based methods demonstrate that the scene reconstruction system described herein is able to achieve more accurate reconstructions and renderings. The scene reconstruction system further supports scene material editing by modifying the reconstructed reflectance volumes when rendering images.

Accordingly, the scene reconstruction system described herein is able to reconstruct real scenes with challenging non-Lambertian reflectance and complex geometry with occlusions and shadowing. Moreover, it accurately generalizes to novel viewpoints and lighting, including non-collocated lighting, rendering photorealistic images that are significantly better than state-of-the-art mesh-based methods. Furthermore, the learned reflectance volumes are editable, allowing for modifying the materials of the captured scenes when rendering images.

Example System for Scene Reconstruction Using Geometry and Reflectance Volumes

Figure 1:
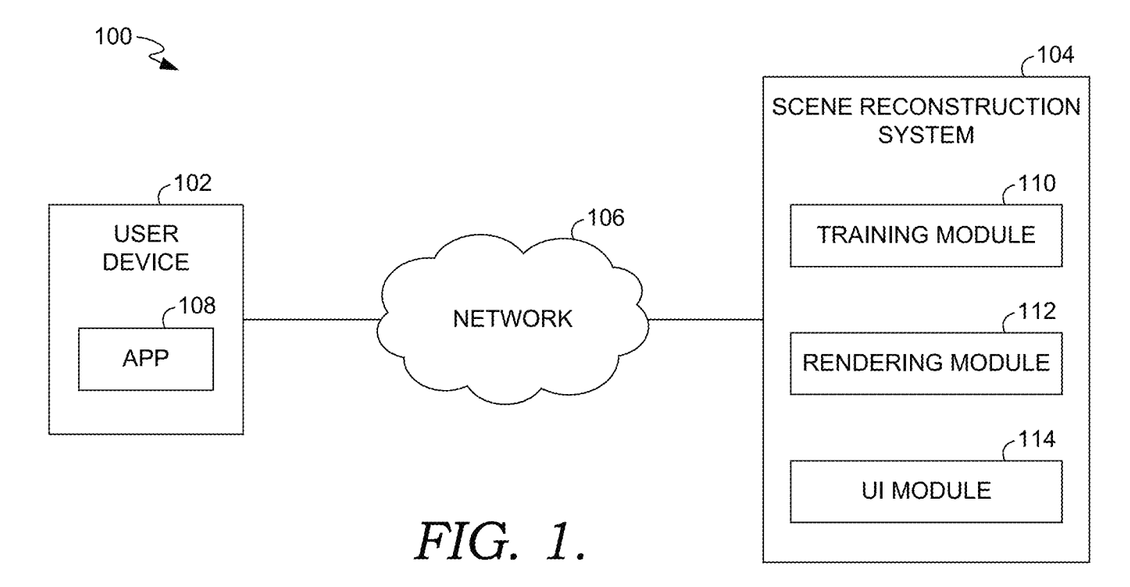
FIG. 1 is a block diagram illustrating an exemplary system in accordance with some implementations of the present disclosure.

With reference now to the drawings, FIG. 1 is a block diagram illustrating an exemplary system for scene reconstruction from images of the scene using geometry and reflectance volumes in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a scene reconstruction system 104. Each of the user device 102 and scene reconstruction system 104 shown in FIG. 1 can comprise one or more computer devices, such as the computing device 900 of FIG. 9, discussed below. As shown in FIG. 1, the user device 102 and the scene reconstruction system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the scene reconstruction system 104 could be provided by multiple server devices collectively providing the functionality of the scene reconstruction system 104 as described herein. Additionally, other components not shown may also be included within the network environment.

At a high level, the scene reconstruction system 104 trains a network to learn a volume representation of a scene based on a set of input images of the scene and uses the learned volume representation to render images of the scene. As shown in FIG. 1, the scene reconstruction system 104 includes a training module 110, a rendering module 112, and a user interface (UI) module 114. These components may be in addition to other components that provide further additional functions beyond the features described herein.

The scene reconstruction system 104 can be implemented using one or more server devices, one or more platforms with corresponding application programming interfaces, cloud infrastructure, and the like. While the visual search system 104 is shown separate from the user device 102 in the configuration of FIG. 1, it should be understood that in other configurations, some or all of the functions of the visual search system 104 can be provided on the user device 102. For instance, in some embodiments, the scene reconstruction system 104 is provided entirely on the user device 102.

Given a set of input images of a scene, the training module 110 trains a network to learn a volume representation of the scene. The scene can be any real scene with any number of objects. The set of input images comprises images taken from different viewpoints of the scene. As will be described in further detail below, the images may be taken with collocated viewing and lighting to facilitate the training process. For instance, the images could be captured using the built-in camera and light on a mobile phone. In accordance with the technology described herein, the learned volume representation of the scene represents both the geometry and reflectance of the scene. To enable accurate renderings of the scene, the network may be trained using a loss function that minimizes a difference between the input images and images rendered using the volume representation.

The rendering module 112 renders images of the scene using the learned volume representation of the scene. In some configurations, the rendering module 112 performs ray marching through the volume representation given a viewing location and a lighting location to generate an image of the scene. During training, the rendering module 112 can render images of the scene with the same viewing and lighting location of the input images to provide rendered images for comparison with the input images when evaluating the loss function. For instance, the rendering module 112 may render images using collocated viewing and lighting locations in instances in which the input images were captured using collocated viewing and lighting.

After training, the rendering module 112 may render images under arbitrary viewing and lighting locations (which are not necessarily collocated even if the input images were captured using collocated viewing and lighting). For instance, the UI module 114 may provide a user interface to a user device, such as the user device 102, that allows a user to provide input adjusting the viewing location and lighting location (e.g., via mouse movement, using slider bars, or other UI elements). The rendering module 112 renders an image given the lighting location and viewing location indicated by the user input from the user interface. In some configurations, the user interface may further provide UI elements for adjusting the material property of objects in the scene. This allows for the reflectance of the objects (e.g., glossiness) to be adjusted. Given input from the user interface setting the material property for the scene, the rendering module 112 renders an image of the scene by adjusting the reflectance based on the input.

The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the scene reconstruction system 104. The application 108 can be, for instance, a web browser or a dedicated application for providing functions, such as those described herein. The application 108 can present the UI provided by the UI module 114 and/or present images of the scene rendered by the rendering module 112. In some configurations, the application 108 may comprise some or all components of the scene reconstruction system 104.

Figure 2:
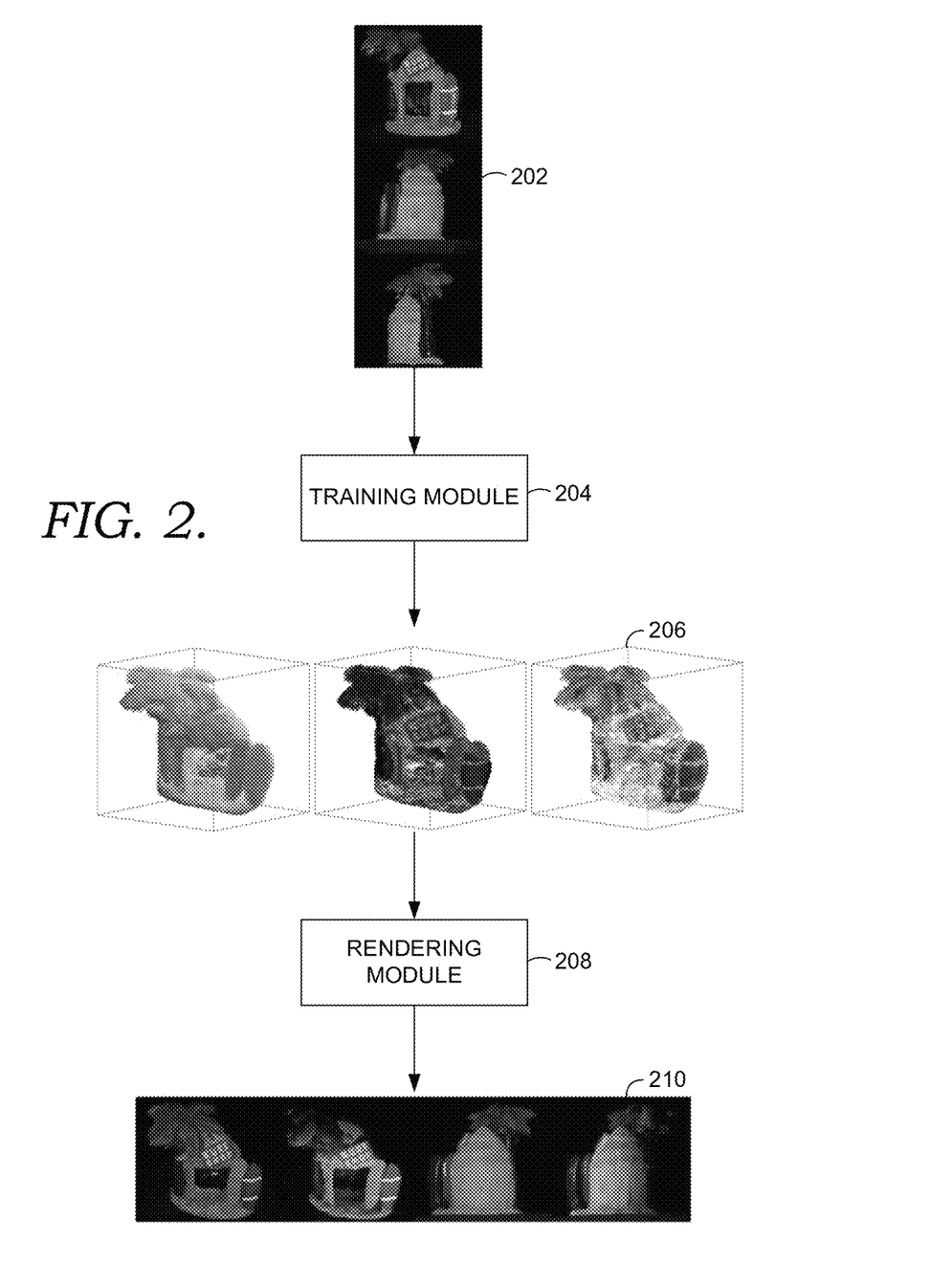
FIG. 2 provides an provides an example of scene reconstruction in accordance with some implementations of the present disclosure.

FIG. 2 provides an example of scene reconstruction using the technology described herein. As shown in FIG. 2, a set of images 202 of a scene are used by the training module 204 to train a network to learn a volume representation 206 of the scene. In this example, the set of images 202 comprise images of a single object taken in a dark room using a camera of a mobile device with the flash on the mobile device. As such, each image from the set of images 202 was captured under collocated viewing and lighting directions. The volume representation 206 of the scene in this example comprises an opacity volume (not shown), a normal volume, albedo volume, and roughness volume. The volume representation 206 of the scene is used by the rendering module 208 to render images 210 under different viewing and lighting directions. This enables free navigation of the scene under arbitrary viewpoints and novel lighting conditions.

Figure 3:
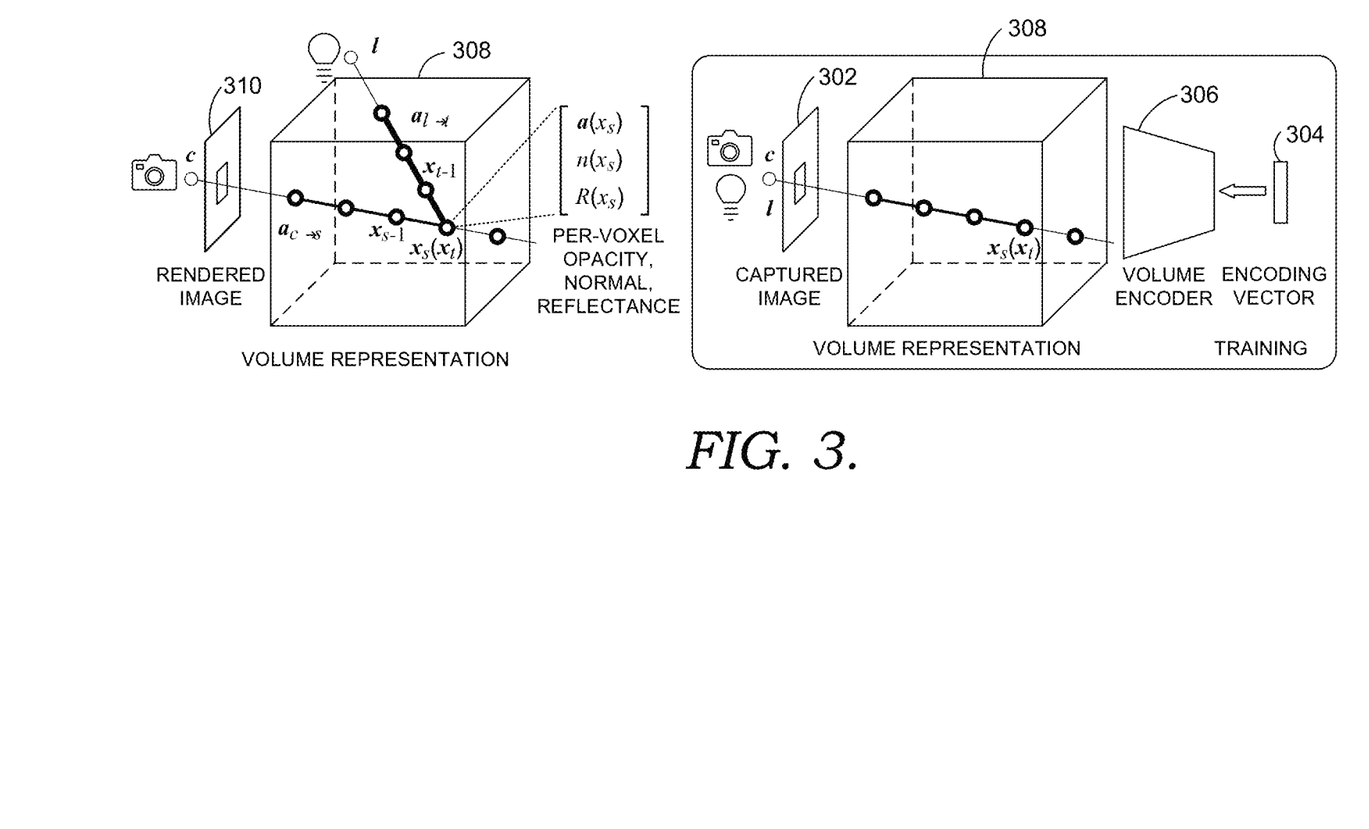
FIG. 3 is a diagram illustrating training a network to learn a volume representation of scene and using the volume representation to render an image of the scene in accordance with some implementations of the present disclosure.

With reference now to FIG. 3, a diagram is provided that illustrates training a network to learn a volume representation of a scene and using the volume representation to render an image of the scene in accordance with some aspects of the technology described herein. During training (as shown on the right-hand side of FIG. 3), a volume representation 308 of a scene is learned given a set of input images of the scene, such as the input image 302. In some configurations (such as that represented by FIG. 3), the set of input images are captured with collocated camera and light. The volume representation 308 of the scene is generated by decoding an encoding vector 304 using a volume decoder 306. In some configurations, the volume decoder may be a neural network, such as a 3D convolutional neural network. To learn the volume representation 308, the combination of the encoding vector 304 and network weights of the volume decoder 306 are the unknown variables being optimized during training (i.e., optimized by iteratively updating the encoding vector 304 and network weights of the volume decoder 306, for instance, by backpropagation). Training may include enforcing a loss function between the input image and rendered images generated using the volume representation 308.

The volume representation 308 capture scenes geometry and appearance. In accordance with the example of FIG. 3, each voxel consists of opacity $\alpha$, normal n, and reflectance (e.g., material coefficients) R. During rendering (as shown on the left-hand side of FIG. 3), a rendered image 310 is generated by performing ray marching through each pixel and contributions are accumulated from each point $x_s$ along the ray. Each contribution is calculated using the local normal, reflectance, and lighting information. Opacity is accumulated from both the camera $\alpha_{c \to s}$ and the light $\alpha_{l \to t}$ to model the light transport loss in both occlusions and shadows.

As shown in FIG. 3, some configurations learn a volume representation of a scene, including both geometry and reflectance, from a deep network, and the volume representation is used to render images in a fully differentiable end-to-end process. In some aspects, this is accomplished by a differentiable volume ray marching module, which is motivated by physically-based volume rendering. The following description will provide the volume rendering method and volumetric scene representation used in some aspects of the technology described herein. How these volumes are learned from unstructured images will then be described in further detail below.

Volume rendering overview. Unlike a mesh that is comprised of points with complex connectivity, a volume is a regular 3D grid, suitable for convolutional operations. Volumes have been widely used in deep learning frameworks for 3D applications. However, previous neural volumetric representations have only represented pixel colors; this can be used for view synthesis, but does not support relighting or scene editing. In contrast, the technology described herein jointly learns geometry and reflectance (i.e. material parameters) volumes to enable broader rendering applications including view synthesis, relighting, and material editing in a comprehensive framework.

In general, volume rendering is governed by the physically-based volume rendering equation (radiative transfer equation) that describes the radiance that arrives at a camera:

$$L(c,\omega_o) = \int_0^\infty \tau(c,x)[L_e(x,\omega_o) + L_s(x,\omega_o)]dx,$$

This equation integrates emitted, $L_e$, and in-scattered, $L_s$, light contributions along the ray starting at camera position c in the direction $-\omega_o$. Here, x represents distance along the ray, and $x = c - \omega_o$ is the corresponding 3D point. $\tau(c, x)$ is the transmittance factor that governs the loss of light along the line segment between c and x:

$$\tau(c,x) = e^{-\int_0^x \sigma_t(z)dx} \quad (2)$$

where $\sigma_t(Z)$ is the extinction coefficient at location z on the segment. The in-scattered contribution is defined as:

$$L_s(x,\omega_o) = \int_S f_p(x,\omega_o,\omega_i) L_i(x,\omega_i) d\omega_i, \quad (3)$$

in which S is a unit sphere, $f_p(x, \omega_o, \omega_i)$ is a generalized (unnormalized) phase function that expresses how light scatters at a point in the volume, and $L_i(x, \omega_i)$ is the incoming radiance that arrives at x from direction $\omega_i$.

In theory, fully computing $L(c, \omega_o)$ requires multiple-scattering computation using Monte Carlo methods, which is computationally expensive and unsuitable for deep learning techniques. In some aspects, a simplified case with a single point light, single scattering and no volumetric emission is considered. The transmittance between the scattering location and the point light is handled the same way as between the scattering location and camera. The generalized phase function $f_p(x, \omega_o, \omega_i)$ becomes a reflectance function $f_r(\omega_o, \omega_i, n(x), R(x))$ which computes reflected radiance at x using its local surface normal $n(x)$ and the reflectance parameters $R(x)$ of a given surface reflectance model. Therefore, Eqn. 1 and Eqn. 3 can be simplified and written concisely as:

$$L(c,\omega_o) = \int_0^\infty c(c,x)\tau(x,l) f_r(\omega_o,\omega_i,n(x),R(x)) L_i(x,\omega_i) dx, \quad (4)$$

where l is the light position, $\omega_i$ corresponds to the direction from x to l, $\tau(c, x)$ still represents the transmittance from the scattering point x to the camera c, the term $\tau(x, l)$ (that was implicitly involved in Eqn. 3) is the transmittance from the light l to x and expresses light extinction before scattering, and $L_i(x, \omega_i)$ represents the light intensity arriving at x without considering light extinction.

Discretized, differential volume rendering module. To make volume rendering practical in a learning framework, Eqn. 4 is further approximated by turning it into a discretized version, which can be evaluated by ray marching. This is classically expressed using opacity compositing, where opacity α is used to represent the transmittance with fixed ray marching step size Δx. Points are sequentially sampled along a given ray, $\omega_o$ from the camera position, c as:

$$x_s = x_{s-1} - \omega_o \Delta x = c - s\omega_o \Delta x. \quad (5)$$

The radiance $L_s$ and opacity $\alpha_{c \to s}$, along this path, c→s, are recursively accumulated until $x_s$ exits the volume as:

$$L_s = L_{s-1} + [1 - \alpha_{c \to (s-1)}][1 - \alpha_{l \to (t-1)}] \alpha(x_s) L(x_s), \quad (6)$$

$$\alpha_{c \to s} = \alpha_{c \to (s-1)} + [1 - \alpha_{c \to (s-1)}] \alpha(x_s), \quad (7)$$

$$L(x_s) = f_r(\omega_o, \omega_i, n(x_s), R(x_s)) L_i(x_s, \omega_i). \quad (8)$$

Here, $L(x_s)$ computes the reflected radiance from the reflectance function and the incoming light, $\alpha_{c \to s}$, represents the accumulated opacity from the camera c to point $x_s$, and corresponds to $\tau(c, x)$ in Eqn 4. $\alpha_{l \to t}$ represents the accumulated opacity from the light l—i.e., $\tau(x, l)$ in Eqn. 4—and requires a separate accumulation process over samples along the l→$x_s$ ray, similar to Eqn. 7:

$$x_s = x_{t-1} - \omega_l \Delta x = l - t\omega_l \Delta x, \quad (9)$$

$$\alpha_{l \to t} = \alpha_{l \to (t-1)} + [1 - \alpha_{l \to (t-1)}] \alpha(x_t). \quad (10)$$

In this rendering process (Eqn. 5-10), a volume representation of a scene is provided by an opacity volume α, a normal volume n and a BRDF volume R; together, these express the geometry and reflectance of the scene. The simplified opacity volume α is essentially one minus the transmission τ (depending on the physical extinction coefficient $\sigma_t$) over a ray segment of a fixed step size Δx; this means that α is dependent on Δx.

The physically-based ray marching is fully differentiable, so it can be easily incorporated in a deep learning framework and backpropagated through. With this rendering module, a neural rendering framework is presented that simultaneously learns scene geometry and reflectance from captured images.

Various configurations of the technology described herein support any differentiable reflectance model $f_r$. By way of example only and not limitation, some configurations use the simplified Disney BRDF model that is parameterized by diffuse albedo and specular roughness. The opacity volume is a general geometry representation, accounting for both occlusions (view opacity accumulation in Eqn. 7) and shadows (light opacity accumulation in Eqn. 10). This neural rendering with ray marching is illustrated in FIG. 3. Note that, because the acquisition setup has collocated camera and lighting, $\alpha_{l \to t}$ becomes equivalent to $\alpha_{c \to s}$ during training, thus requiring only one-pass opacity accumulation from the camera. However, the learned opacity can still be used for re-rendering under any non-collocated lighting with two-pass opacity accumulation.

Note that while alpha compositing-based rendering functions have been used in previous work on view synthesis, their formulations are not physically-based and are simplified versions that don't model lighting. In contrast, the framework provided in accordance with some aspects of the technology described herein is physically-based and models single-bounce light transport with complex reflectance, occlusions and shadows.

Overview of learning volume representation. Given a set of images of a real scene captured under multiple known viewpoints with collocated lighting, a neural network reconstruct a volume representation of a real scene that reflects geometry and reflectance of the scene. As an example of one configuration, a network starts from a 512-channel deep encoding vector that encodes scene appearance. The encoding vector is decoded to an opacity volume $\alpha$, normal volume n and reflectance volume R for rendering. The scene encoding vector need not be predicted by any network encoder; instead, the approach jointly optimizes for a scene encoding vector and scene-dependent decoder network.

In some configurations, the network infers the geometry and reflectance volumes in a transformed 3D space with a learned warping function W. During training, the network learns the warping function W, and the geometry and reflectance volumes $\alpha_w$, $n_w$, $R_w$, where the subscript w refers to a volume in the warped space. The corresponding world-space scene representation is expressed by $V(x)=V_w(W(x))$, where V is $\alpha$, n or R. Bilinear interpolation is used to fetch a corresponding value at an arbitrary position x in the space from the discrete voxel values. In some aspects, a decoder-like network learns to decode the warping function and the volumes from the deep scene encoding vector. Additionally, some approaches use a rendering loss between rendered and captured images as well as two regularizing terms, as will be discussed in further detail below.

Geometry and reflectance. To decode the geometry and reflectance volumes $\alpha_w$, $n_w$, $R_w$), upsampling 3D convolutional operations are used in some configurations to 3D-upsample the deep scene encoding vector to a multi-channel volume that contains the opacity, normal and reflectance. Multiple transposed convolutional layers with stride 2 may be used to upsample the volume, each of which is followed by a LeakyRelu activation layer. The network regresses an 8-channel 128×128×128 volume that includes $\alpha_w$, $n_w$ and $R_w$—one channel for opacity $\alpha_w$, three channels for normal $n_w$, and four channels for reflectance $R_w$ (three for albedo and one for roughness). These volumes express the scene geometry and reflectance in a transformed space, which can be warped to the world space for ray marching.

Warping function. To increase the effective resolution of the volume, an affine-based warping function may be learned in some configurations. The warping may comprise a global warping and a spatially-varying warping. The global warping is represented by an affine transformation matrix $W_g$. The spatially varying warping is modeled in the inverse transformation space, which is represented by six basis affine matrices $\{W_j\}_{j=1}^{16}$ and a 32×32×32 16-channel volume B that contains spatially-varying linear weights of the 16 basis matrices. Specifically, given a world-space position x, the complete warping function W maps it into a transformed space by:

$$W(x) = \left[\sum_{j=1}^{16} B_j(x) W_j\right]^{-1} W_g x, \quad (11)$$

where $B_j(x)$ represents the normalized weight of the jth warping basis at x. Here, each global or local basis affine transformation matrix $W_*$ is composed of rotation, translation and scale parameters, which are optimized during the training process. The network decodes the weight volume B from the deep encoding vector using a multi-layer perceptron network with fully connected layers.

Loss function. The network learns the scene volumes in some configurations using a rendering loss computed using the differentiable ray marching process discussed in Sec. 3. During training, pixels may be randomly sampled from the captured images and the ray marching (using known camera calibration) is performed to get the rendered pixel colors $L_k$ of pixel k; the approach may supervise them with the ground truth colors $\tilde{L}_k$ in the captured images using a $L_2$ loss. In some configurations, regularization terms are also applied from additional priors. One approach only considers opaque objects and enforces the accumulated opacity along any camera ray $\alpha_{c_k} \to s'$ (see Eqn. 7, here k denotes a pixel and s' reflects the final step that exits the volume) to be either 0 or 1, corresponding to a background or foreground pixel, respectively. Some approaches may also regularize the per-voxel opacity to be sparse over the space by minimizing the spatial gradients of the logarithmic opacity. Accordingly, the total loss function in some configurations is given by:

$$\sum_k \|L_k - \tilde{L}_k\|^2 + \quad (12)$$
$$\beta_1 \sum_k [\log(a_{c_k} \to s') + \log(1 - a_{c_k} \to s')] + \beta_2 \sum \|\nabla_x \log\alpha(x)\|$$

Here, the first part reflects the data term, the second regularizes the accumulated a and the third regularizes the spatial sparsity.

Training details. In accordance with some configurations, the volume representation is built as a cube located at $[-1, 1]^3$. During training, 128×128 pixels may be randomly sampled from 8 captured images for each training batch, and ray marching performed through the volume using a step size of 1/64. Initially, the approach sets $\beta_1=\beta_2=0.01$; and then increases these weights to $\beta_1=1.0$, $\beta_2=0.1$ after 300000 iterations, which helps remove the artifacts in the background and recover sharp boundaries.

Figure 4:
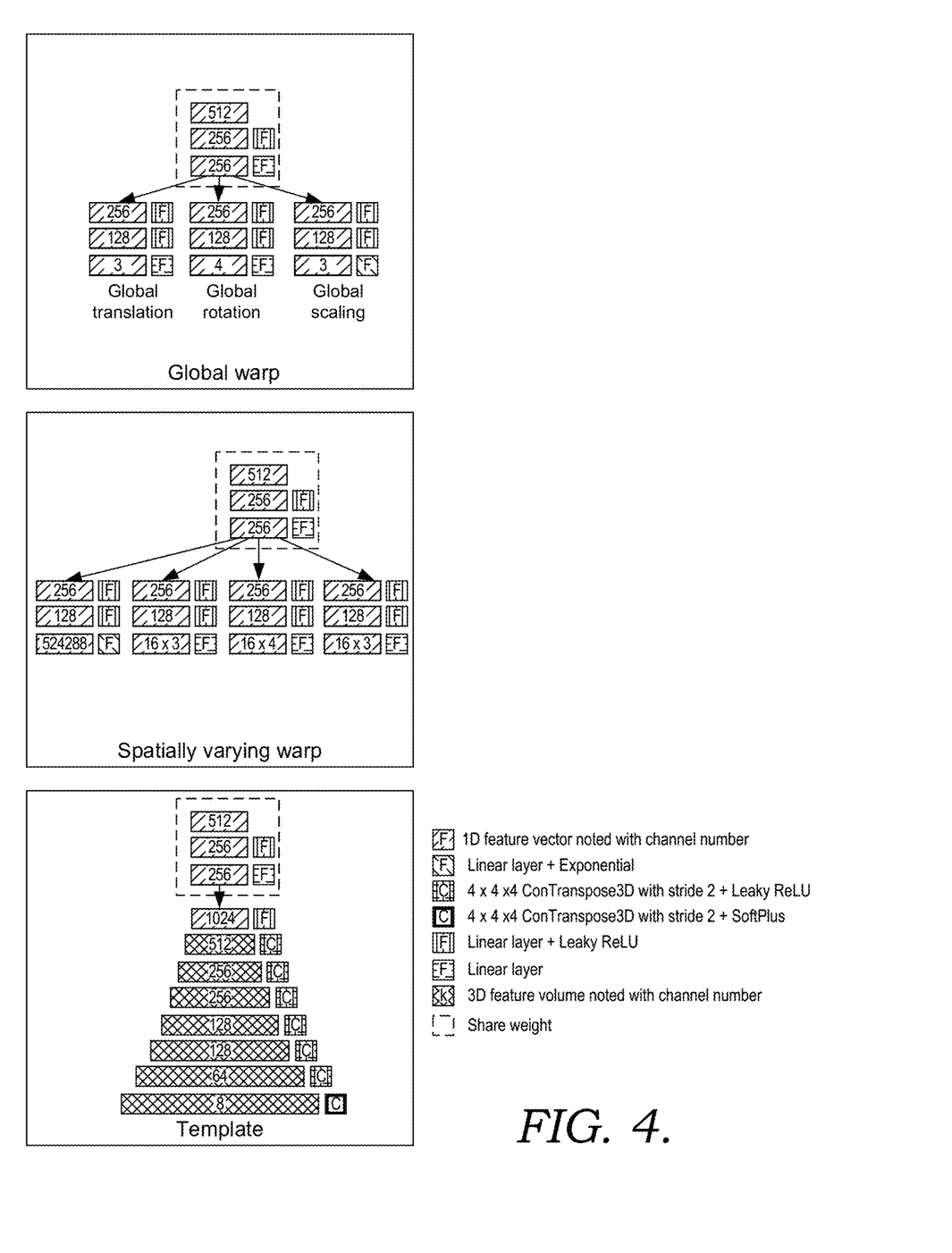
FIG. 4 is a diagram showing an overview of a network architecture in accordance with some implementations of the present disclosure.

With reference now to FIG. 4, a diagram is provided showing an overview of a network architecture in accordance with one aspect of the technology described herein. It should be understood that the network architecture shown in FIG. 4 is provided by way of example only and not limitation. Other network architectures could be employed within the scope of embodiments of the technology described herein. The network shown in FIG. 4 starts from a 512-channel encoding vector initialized using random samples from a normal distribution. The encoding vector first goes through two fully connected layers and then is fed to different decoders to predict the global warping parameters, spatially varying warping parameters, and the template volume. The global warping parameters $W_g$ consist of a 3-channel scaling vector, a 3-channel translation vector and a 4-channel rotation vector represented as a quaternion. The spatially varying parameters consist of 16 warping bases $\{W_j\}_{j=1}^{16}$ and a weight volume B. Similar to the global warping, each warping basis is composed of a scaling, a translation and a rotation. The weight volume B has 16 channels and a resolution of 32×32×32, which encodes the spatially varying weight of each basis. Finally, the template volume V has a resolution of 128×128×128; it has 8 channels with 1 channel for opacity, 3 channels for normal, 3 channels for diffuse albedo and 1 channel for roughness. Additionally, the albedo and roughness are transformed to the range of [0,1], and the predicted normal vectors are normalized.

Example Method for Scene Reconstruction Using Volume Representation

Figure 5:
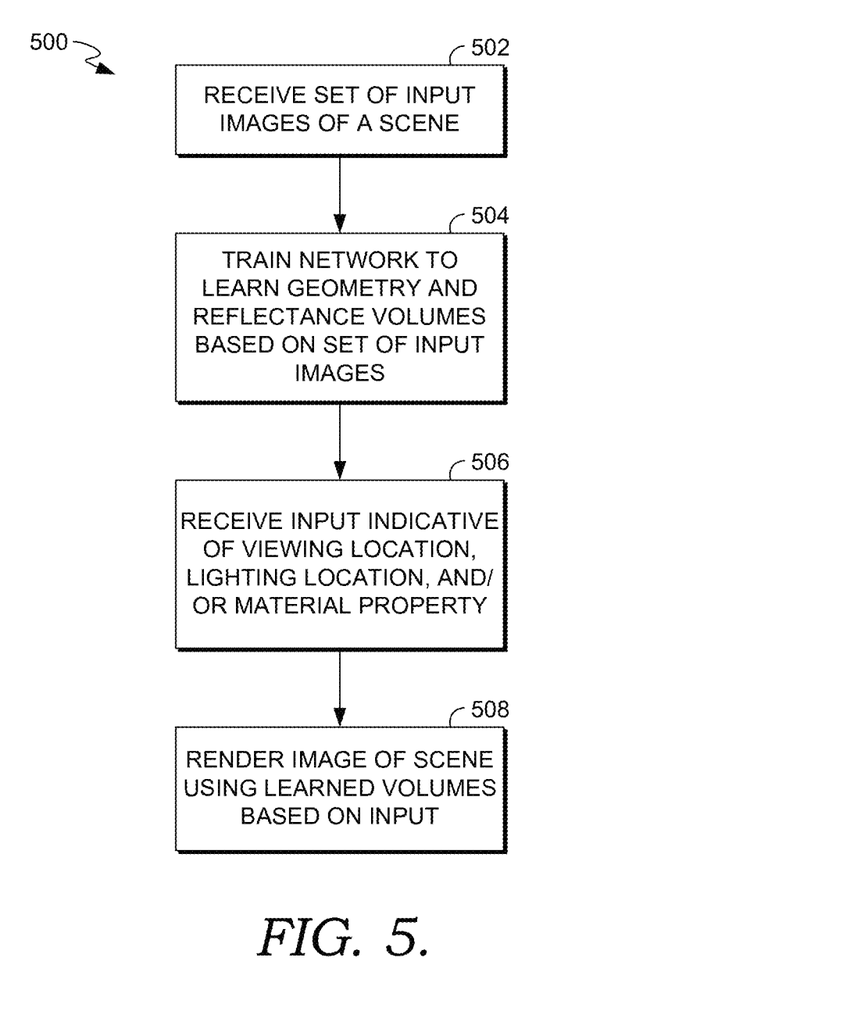
FIG. 5 is a flow diagram showing a method for training a network to learn a volume representation of a scene capture in a set of input images and using the volume representation to render images of the scene in accordance with some implementations of the present disclosure.

With reference now to FIG. 5, a flow diagram is provided that illustrates a method 500 for training a network to learn a volume representation of a scene captured in a set of input images and using the volume representation to render images of the scene. The method 500 may be performed, for instance, by the training module 110 and rendering module 112 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, a set of input images is accessed. The input images comprise different viewpoints of a scene, which may include one or more objects. In some configurations, the input images may be captured using collocated viewing and lighting. For instance, the input images may be captured using the built-in camera and light on a mobile device.

A network is trained using the set of input images to learn a volume representation of the scene, as shown at block 504. The volume representation represents both the geometry and reflectance of the scene captured by the input images. In some configurations, the network comprises a volume decoder that decodes an encoding vector to the volume representation. During training, a loss function may be employed that minimizes a difference between the input images and images rendered using the volume representation. At each iteration, the encoding vector and weights of the volume decoder may be updated, for instance, using backpropagation.

As shown at block 506, input is received for generating an image of the scene. The input indicates a viewing location and a lighting location. For instance, a user interface may be provided that allows for input adjusting the viewing location and lighting location. In some configurations, the user interface may further receive input adjusting the material property of the scene.

Based on the input received at block 506, an image of the scene is rendered using the learned volume representation, as shown at block 508. In some configurations, the image is rendered by ray marching through the volume representation given the viewing location and lighting location specified by the input. In instances in which the input includes an adjustment to the material property of the scene, the reflectance is adjusted when rendering the image.

Examples and Performance Evaluation

This section presents results of scene reconstruction of real captured scenes using the technology described herein. The acquisition setup and data pre-processing are first introduced. Results using the technology described herein are compared against the state-of-the-art mesh-based appearance acquisition method, followed by a detailed analysis of the experiments. The experiments also demonstrate relighting, view synthesis, and material editing results provided by the technology described herein.

Data acquisition. The technology described herein learns the volume representation in a scene dependent way from images. In some cases, the images are captured using collocated view and light. Additionally, in some cases, input images distributed around a target scene are used to learn complete appearance. Such data can be practically acquired, for instance, by shooting a video using a handheld cellphone or using a robotic arm to automatically capture more uniformly distributed images around scenes for convenience and thorough evaluations. These approaches were used to evaluate the performance of the technology described herein. In the robotic arm setups, a mobile phone was mounted to the robotic arm and about 480 images were captured using the mobile phone's camera and the built-in flashlight in a dark room. A subset of 100 images were left out for validation purposes and the others were used for training. The mobile phone was also used to capture a 4-minute video of scene with one image selected for training for every 20 frames, which effectively provides 310 training images.

Data pre-processing. Objects in the scenes are roughly located around the center of the images. One fixed rectangular region was selected around the center that covers the object across all frames, and the fixed rectangular region was used to crop the images as input for training. The resolution of the cropped training images fed to the network ranges from 400×500 to 1100×1100. Note that a foreground mask for the object was not used. The method leverages the regularization terms in training, which automatically recovers a clean background. The captured images were calibrated using structure from motion (SfM) in COLMAP to get the camera intrinsic and extrinsic parameters. Since SfM may fail to register certain views, the actual number of training images varies from 300 to 385 in different scenes. The center and bounding box of the captured object were estimated with the sparse reconstructions from SfM. The center of the object was translated to the origin and scaled to fit into a $[-1, 1]^3$ cube.

Implementation and timing. In this experiment, the system (both neural network and differentiable volume rendering components) was implemented using PyTorch. The network was trained using four NVIDIA 2080Ti RTX GPUs for about two days (about 450000 iterations; though 200000 iterations for 1 day typically already converges to good results. At inference time, the scene was directly rendered from the reconstructed volumes without the network. It took about 0.8 s to render a 700×700 image under collocated view and light. For non-collocated view and light, the rendering included connecting each shading point to the light source with additional light-dependent opacity accumulation, which may be very expensive if done naively. To facilitate this process, ray marching was performed from the light's point of view and the accumulated opacity was precomputed at each spatial position of the volume. During rendering, the accumulated opacity for the light ray can be directly sampled from the precomputed volume. By doing so, the final rendering under arbitrary light and view took about 2.3 s.

Figure 6:
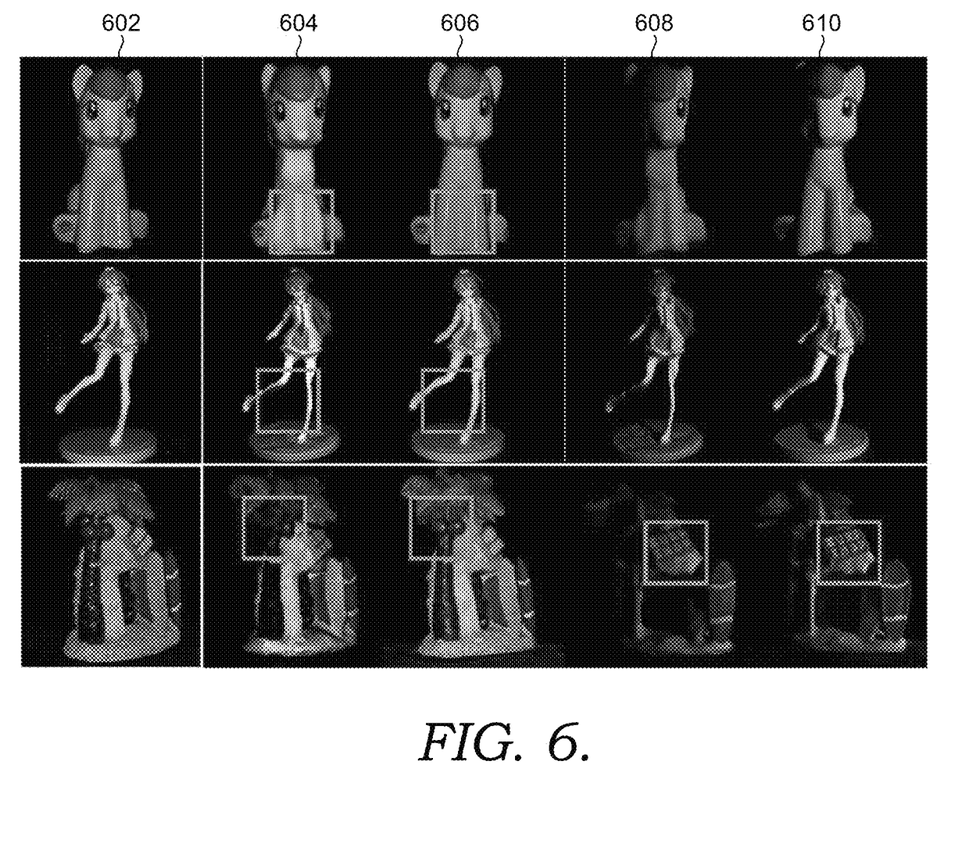
FIG. 6 provides comparisons of renderings of a scene using the technology described herein and a mesh-based approach under both collocated and non-collocated view-light conditions.

Comparisons with mesh-based reconstruction. A practical acquisition setup was used in which unstructured images were captured using a mobile phone with its built-in flashlight on in a dark room. Reconstructions using the technology described herein were compared against reconstructions from a state-of-the-art method for mesh-based geometry and reflectance reconstruction, that used the same mobile phone setup to reconstruct a mesh with per-vertex BRDFs, and supports both relighting and view synthesis. FIG. 6 shows comparisons on renderings under both collocated and non-collocated view-light conditions. The comparison results are generated from the same set of input images for three different scenes (in each row; row 1 comprising a PONY scene; row 2 comprising a GIRL scene; and row 3 comprising a HOUSE scene); the column 602 presents one input image of each object. Columns 604 and 606 present renderings using the mesh-based approach and the approach of the technology described herein, respectively, under collocated view-light conditions. Columns 608 and 610 present renderings using the mesh-based approach and the approach of the technology described herein, respectively, under non-collocated view-light conditions.

As shown in FIG. 6, renderings using the technology described herein are significantly better than the mesh-based method in terms of both geometry and reflectance. Note that, the mesh-based method leveraged a state-of-the-art MVS method to reconstruct the initial mesh from captured images and performed an optimization to further refine the geometry. This, however, still fails to recover the accurate geometry in texture-less, specular and thin-structured regions in those challenging scenes, which leads to seriously distorted shapes in PONY, over-smoothness and undesired structures in HOUSE, and degraded geometry in GIRL. The learning-based volumetric representation of the technology described herein avoids these mesh-based issues and models the scene geometry accurately with many details. Moreover, it is also very difficult for the classical per-vertex BRDF optimization to recover high-frequency specularities, which leads to over-diffuse appearance in most of the scenes; this is caused by the lack of constraints for the high-frequency specular effects, which appear in very few pixels in limited input views. In contrast, the optimization of the technology described herein is driven by a neural rendering framework with deep network priors, which effectively correlates the sparse specularities in different regions through network connections and recovers realistic specularities and other appearance effects.

Comparison on synthesizing novel views. A comparison was also made on synthesizing novel views under collocated lights using the technology described herein against a prior view synthesis method that encodes view-dependent appearance in a learnt 3D-aware neural representation. Note that the prior view synthesis method does not support relighting. As shown in Table 1 below, the technology described herein is able to generate renderings of higher quality with higher peak signal-to-noise ratio (PSNR) and structural similarity index measure (SSIM) scores. In contrast, the prior view synthesis method fails to reason about the complex geometry in the real scenes, thus resulting in degraded image quality.

TABLE 1

Comparison with Prior View Synthesis Method

|  | House Scene | Cartoon Scene |
| --- | --- | --- |
| Prior View Synthesis Method | 0.786/25.81 | 0.532/16.34 |
| Present Technology | 0.896/30.44 | 0.911/29.14 |

Figure 7:
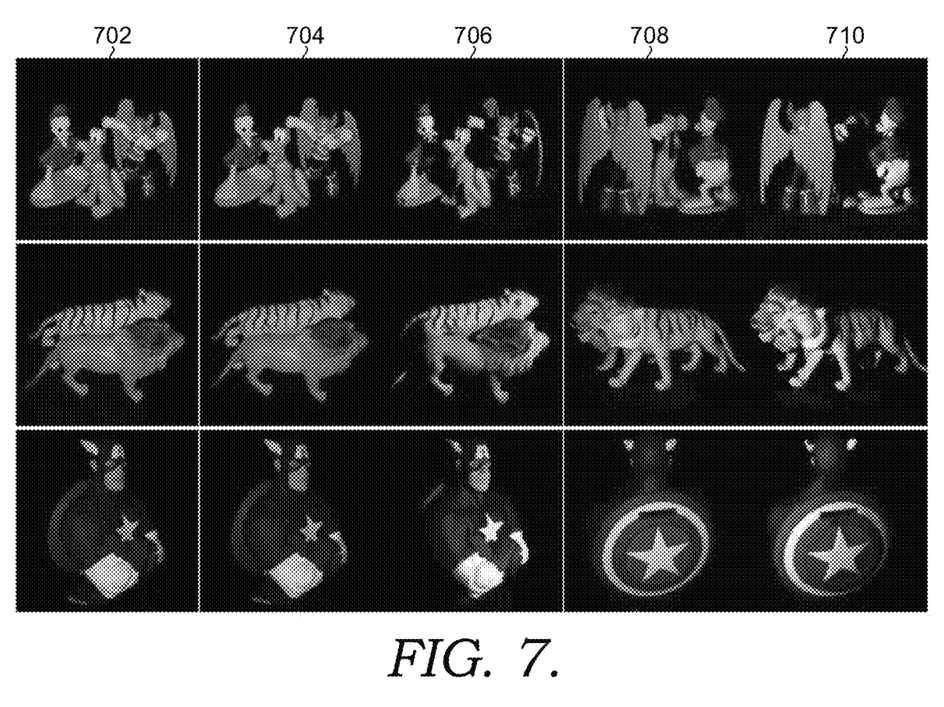
FIG. 7 provides examples of renderings illustrating relighting and view synthesis results of complex real scenes generated using some implementations of the present disclosure.

Relighting and View Synthesis. FIG. 7 shows additional relighting and view synthesis results of complex real scenes generated using the technology describe herein. Each row of FIG. 7 shows renderings generated from a set of input images for three different scenes (row 1 comprising a CARTOON scene; row 2 comprising an ANIMALS scene; and row 3 comprising a CAPTAIN scene). Column 702 presents one input image for each scene. Columns 704 and 706 show renderings with a first viewing location and different lighting locations. Columns 708 and 710 show renderings with a second viewing location and different lighting conditions As can be seen from FIG. 7, the technology described herein is able to handle scenes with multiple objects, as shown in the CARTOON scene and the ANIMALS scene. The volumetric representation can accurately model complex occlusions between objects and reproduce realistic cast shadows under novel lighting, which are never observed by the network during the training process. In the CAPTAIN scene, the results shown were generated from handheld mobile phone captures. Frames were selected from a video at fixed intervals as training data. Despite the potential existence of motion blur and non-uniform coverage, the method is able to generate high-quality results, which demonstrates the robustness and practicality of the approach.

Figure 8:
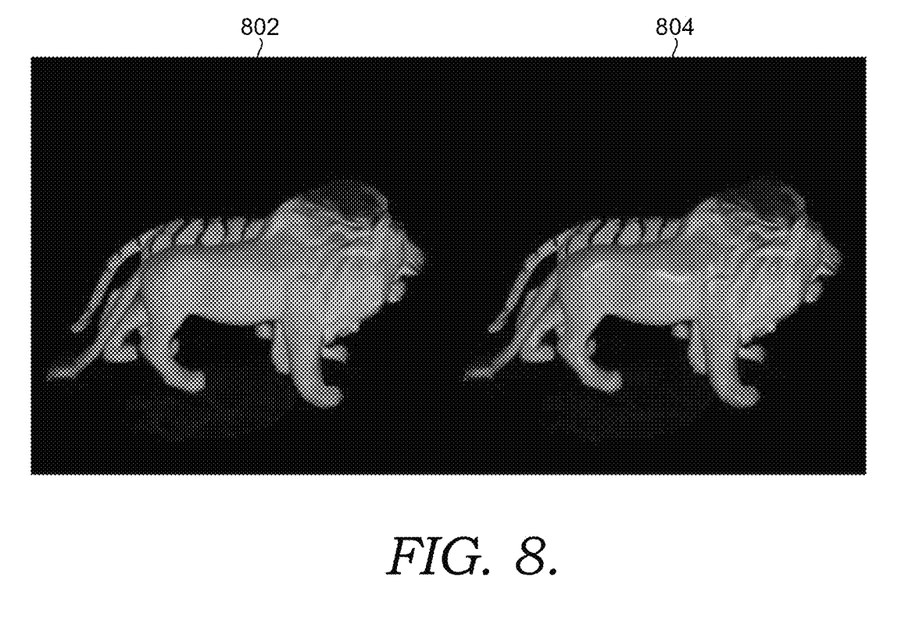
FIG. 8 provides an example of renderings illustrating material editing using some implementations of the present disclosure.

Material editing. The technology described herein learns explicit volumes with physical meaning to represent the reflectance of real scenes. This enables broad image synthesis applications like editing the materials of captured scenes. One example of material editing is shown in FIG. 8, where the scene is made glossier by decreasing the learned roughness in the volume. Image 802 is a rendering before material editing, and image 804 is a rendering after material editing. Note that, the geometry and colors are still preserved in the image 804, while novel specularities are introduced which are not part of the material appearance in the scene. This example illustrates that the technology disentangles the geometry and reflectance of the scene in a reasonable way, thereby enabling sub-scene component editing without influencing other components.

Exemplary Operating Environment

Figure 9:
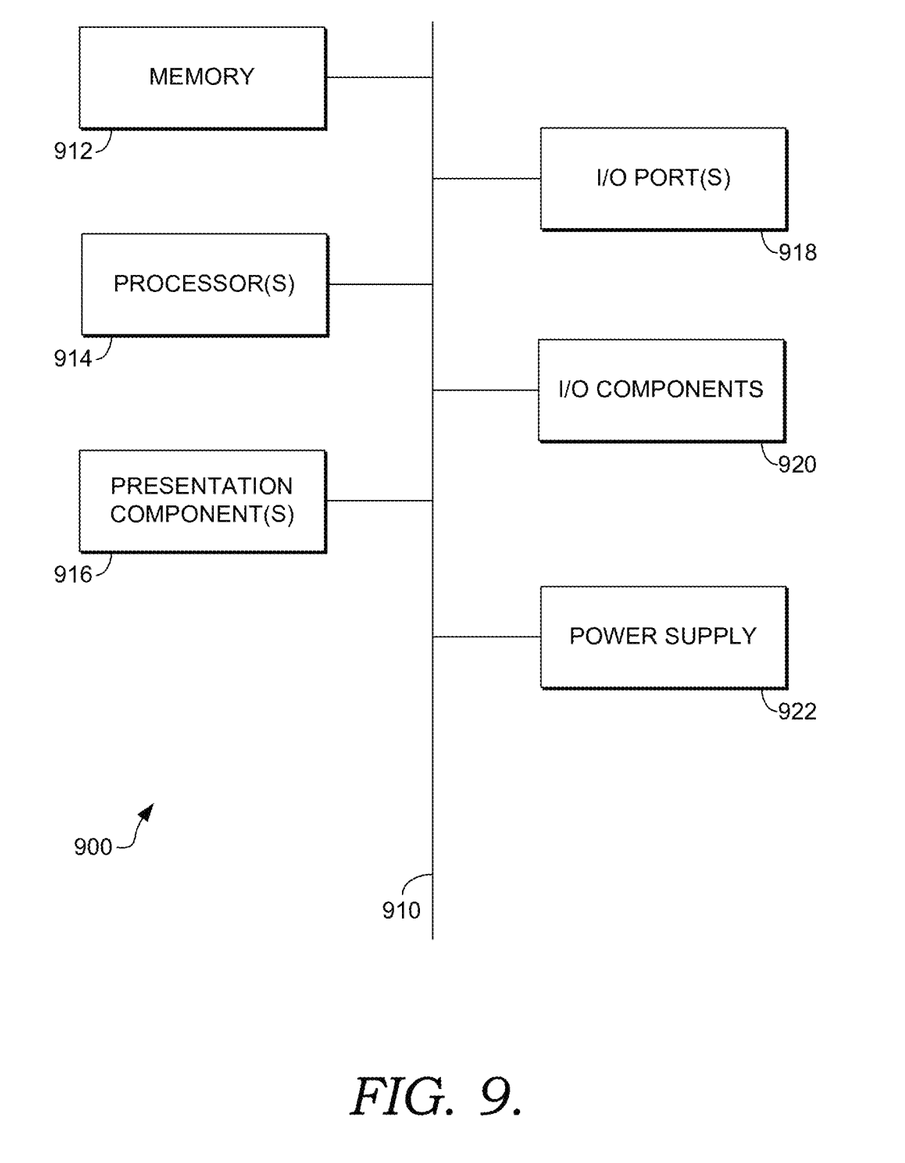
FIG. 9 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:
    using a neural network to provide a volume representation of a scene based on training image data consisting of a set of input 2-dimensional (2D) images of the scene, the volume representation comprising one or more geometry volumes of the scene and one or more reflectance volumes of the scene;
    receiving input for rendering an image of the scene, the input indicative of a view direction and a lighting direction independent of the view direction; and
    based on the input, rendering the image of the scene using the volume representation.

2. The one or more computer storage media of claim 1, wherein the scene comprises a plurality of objects.

3. The one or more computer storage media of claim 1, wherein each input 2D image in the set of input 2D images was captured using collocated viewing and lighting directions.

4. The one or more computer storage media of claim 1, wherein the neural network comprises a volume decoder that decodes an encoding vector to the volume representation of the scene, and wherein the neural network is trained by iteratively:

using the volume representation to generate a rendered training image under viewing conditions of a selected input 2D image from the set of input 2D images; and updating the encoding vector and weights of the volume decoder based on a comparison of the rendered training image with the selected input 2D image.

5. The one or more computer storage media of claim 1, wherein the one or more geometry volumes of the scene comprise an opacity volume and/or a normal volume.

6. The one or more computer storage media of claim 1, wherein the one or more reflectance volumes of the scene comprise a diffuse color volume and/or a roughness volume.

7. The one or more computer storage media of claim 1, wherein the neural network is trained using a loss function that minimizes a difference between pixels of input images from the set of input images and pixels of rendered images generated using the volume representation.

8. The one or more computer storage media of claim 7, wherein the loss function further regularizes accumulated opacity along viewing direction rays and/or regularizes spatial sparsity of per-voxel opacity.

9. The one or more computer storage media of claim 1, wherein the input is further indicative of a material property of an object in the scene, and wherein the image of the scene is rendered based in part by adjusting a reflectance of the object in the scene.

10. A computer-implemented method comprising:
accessing training image data consisting of a set of input 2-dimensional (2D) images of a scene;
training a network to learn one or more geometry volumes of the scene and one or more reflectance volumes of the scene based on the set of input 2D images of the scene, the network comprising a volume decoder that decodes an encoding vector to the one or more geometry volumes and the one or more reflectance volumes; and
rendering an image of the scene under arbitrary viewpoint and arbitrary lighting independent of the arbitrary viewpoint by ray marching through the one or more geometry volumes and the one or more reflectance volumes given a camera position and a light position of the arbitrary viewpoint and the arbitrary lighting.

11. The computer-implemented method of claim 10, wherein the scene comprises a plurality of objects.

12. The computer-implemented method of claim 10, wherein each input 2D image in the set of input 2D images was captured using collocated viewing and lighting.

13. The computer-implemented method of claim 10, wherein the network is trained by iteratively updating the encoding vector and weights of the volume decoder based on an evaluation of a loss function that minimizes a difference between pixels of at least a portion of the set of input 2D images and pixels of rendered images generated using the one or more geometry volumes and the one or more reflectance volumes.

14. The computer-implemented method of claim 13, wherein the loss function further regularizes accumulated opacity along viewing direction rays and/or regularizes spatial sparsity of per-voxel opacity.

15. The computer-implemented method of claim 10, wherein the one or more geometry volumes of the scene comprise an opacity volume and/or a normal volume.

16. The computer-implemented method of claim 10, wherein the one or more reflectance volumes of the scene comprise a diffuse color volume and/or a roughness volume.

17. A computer system comprising:
a processor; and
a computer storage medium storing computer-useable instructions that, when used by the processor, causes the computer system to perform operations comprising:
accessing training image data consisting of a set of input 2-dimensional (2D) images of a scene;
training a network to learn one or more geometry volumes of the scene and one or more reflectance volumes of the scene based on the set of input 2D images by iteratively updating weights of the network and an encoding vector based on an evaluation of a loss function that minimizes differences between input at least a portion of the set of 2D input images and rendered images generated using the one or more geometry volumes and the one or more reflectance volumes;
receiving input identifying a viewing location and a lighting location independent of the viewing location; and
rendering an image of the scene by ray marching through the one or more geometry volumes and the one or more reflectance volumes given the viewing location and the lighting location.

18. The computer system of claim 17, wherein each input 2D image in the set of input 2D images was captured using collocated viewing and lighting, and wherein the viewing location and the lighting location identified by the input are non-collocated.

19. The computer system of claim 17, wherein the one or more geometry volumes of the scene comprise an opacity volume and/or a normal volume, and wherein the one or more reflectance volumes of the scene comprise a diffuse color volume and/or a roughness volume.

20. The computer system of claim 17, wherein the input is further indicative of a material property of an object in the scene, and wherein the image of the scene is rendered based in part by adjusting a reflectance of the object in the scene.

* * * * *